United States Patent
Sasaoka et al.

(10) Patent No.: US 7,153,034 B2
(45) Date of Patent: Dec. 26, 2006

(54) METHOD OF CONSTRUCTING AN OPTICAL TRANSMISSION LINE AND AN OPTICAL TRANSMISSION LINE

(75) Inventors: Eisuke Sasaoka, Yokohama (JP); Masashi Onishi, Yokohama (JP); Takemi Hasegawa, Yokohama (JP); Masayuki Nishimura, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 230 days.

(21) Appl. No.: 10/821,190

(22) Filed: Apr. 9, 2004

(65) Prior Publication Data

US 2004/0258378 A1    Dec. 23, 2004

(30) Foreign Application Priority Data

Apr. 9, 2003 (JP) ............................. P2003-105665

(51) Int. Cl.
*G01N 21/00* (2006.01)
*H04B 10/12* (2006.01)

(52) U.S. Cl. .................. 385/71; 356/73.1; 398/13; 398/20; 398/139; 398/142

(58) Field of Classification Search ............... 356/73.1; 385/71
See application file for complete search history.

(56) References Cited

U.S. PATENT DOCUMENTS 5,611,016 A    3/1997   Fangmann et al.
5,936,719 A *  8/1999   Johnson ..................... 356/73.1
6,473,548 B1   10/2002  Nagayama et al.

* cited by examiner

*Primary Examiner*—Frank G Font
*Assistant Examiner*—Mary El-Shammaa
(74) *Attorney, Agent, or Firm*—McDermott Will & Emery LLP

(57) ABSTRACT

The present invention discloses an optical transmission line constructing method comprising the steps of connecting a plurality of optical fibers differing from each other in terms of a transmission characteristic; making inspection light incident on an entrance end of the connected plurality of optical fibers; detecting, on the entrance end side, respective return light components of the inspection light occurring at individual positions of the plurality of optical fibers in its longitudinal direction; evaluating a characteristic information distribution of return light in the longitudinal direction of the plurality of optical fibers; and constructing an optical transmission line according to a result of the evaluation.

8 Claims, 9 Drawing Sheets

(b) JUNCTION (a) JUNCTION

METHOD OF CONSTRUCTING AN OPTICAL TRANSMISSION LINE AND AN OPTICAL TRANSMISSION LINE

BACKGROUND OF THE INVENTION

1. Field of the Invention

The present invention relates to an optical transmission line in which a plurality of optical fibers differing from each other in terms of a transmission characteristic are connected together, and a method of constructing such an optical transmission line.

2. Related Background Art

Optical transmission lines employed as a medium for transmitting signal light in optical communication systems are required to have a small cumulative chromatic dispersion and low nonlinearity in order to restrain the signal light from deteriorating its waveform. Known as one satisfying such a demand is an optical transmission line in which the polarity of chromatic dispersion changes between positive and negative along the longitudinal axis (see, for example, U.S. Pat. No. 6,473,548). A technique for providing the positive and negative chromatic dispersion parts in such an optical transmission line with different colors and markings in order to distinguish them from each other has been known (see, for example, U.S. Pat. No. 5,611,016).

When constructing an optical transmission line by connecting a plurality of optical fibers differing from each other in terms of a transmission characteristic such as chromatic dispersion, it is not easy to determine whether or not the optical fibers to be connected can constitute an optical transmission line having a desirable characteristic. When connecting an optical fiber to one which has already been placed, in particular, it is practically impossible to see the longitudinal transmission characteristic distribution of the placed optical fiber.

SUMMARY OF THE INVENTION

In order to overcome the problem mentioned above, it is an object of the present invention to provide a method which can easily connect a plurality of optical fibers differing from each other in terms of a transmission characteristic, so as to construct an optical transmission line having a desirable characteristic.

In one aspect, the present invention provides an optical transmission line constructing method comprising the steps of connecting a plurality of optical fibers differing from each other in terms of a transmission characteristic; making inspection light incident on an entrance end of the connected plurality of optical fibers; detecting, on the entrance end side, respective return light components of the inspection light occurring at individual positions of the plurality of optical fibers in a longitudinal direction thereof; evaluating a characteristic information distribution of return light in the longitudinal direction of the plurality of optical fibers; and constructing an optical transmission line according to a result of the evaluation. Preferably, the transmission characteristic is a mode field diameter, and the characteristic information is a power level of return light corresponding to the mode field diameter. Preferably, the inspection light includes first and second wavelengths of light, the transmission characteristic is chromatic dispersion, and the characteristic information is a difference between respective arrival times of the first and second wavelengths at the entrance end. Preferably, the transmission characteristic is transmission loss, and the characteristic information is a power level of return light corresponding to the transmission loss. Preferably, the transmission characteristic is a frequency shift amount, and the characteristic information is a frequency shift of return light inherent in each of the plurality of optical fibers.

In another aspect, the present invention provides an optical transmission line constructing method comprising the steps of choosing one of a plurality of optical fibers, included in a first optical cable, differing from each other in terms of a transmission characteristic, and choosing one of a plurality of optical fibers, included in a second optical cable, differing from each other in terms of the transmission characteristic; making inspection light incident on respective entrance ends of the chosen optical fibers; detecting, on the entrance end side, respective return light components of the inspection light occurring at individual positions of the plurality of optical fibers in a longitudinal direction thereof; evaluating a characteristic information distribution of return light in the longitudinal direction of the plurality of optical fibers; and constructing an optical transmission line according to a result of the evaluation. Preferably, the inspection light is made incident on the entrance ends of the optical fibers by way of a reference optical fiber having a reference transmission characteristic, respective return light components of the inspection light occurring at individual positions of the reference optical fiber and optical fibers in the longitudinal direction are detected, and the characteristic information of return light in the optical fibers is evaluated in comparison with characteristic information of return light in the reference optical fiber.

Instill another aspect, the present invention provides an optical transmission line constructing method comprising the steps of providing a plurality of transmission lines, each comprising at least two kinds of a plurality of optical fibers connected together differing from each other in terms of chromatic dispersion; measuring a dispersion distribution state of the transmission lines in a longitudinal direction thereof; choosing a branch transmission line connectable as a branch at a predetermined position in the longitudinal direction; and establishing a branch connection.

In still another aspect, the present invention provides an optical transmission line constructing method comprising the steps of providing a plurality of transmission lines, each comprising at least two kinds of a plurality of optical fibers connected together differing from each other in terms of chromatic dispersion; measuring a dispersion distribution state of the transmission lines in a longitudinal direction thereof; choosing a transmission line connectable as a transmission line to branch out; and establishing a branch connection.

In still another aspect, the present invention provides an optical transmission line constructing method comprising the steps of measuring a dispersion distribution state in a longitudinal direction of a transmission line comprising at least two kinds of a plurality of optical fibers connected together differing from each other in terms of chromatic dispersion; specifying where a branch connection is possible in the longitudinal direction; and establishing a branch connection.

Instill another aspect, the present invention provides an optical transmission line constructing method comprising the steps of providing, in a first area, a first transmission line constructed by at least two kinds of optical fibers differing from each other in terms of polarity of chromatic dispersion at a predetermined signal light wavelength; providing, in a second area connected to the first area, second and third transmission lines, each constituted by at least two kinds of optical fibers connected together differing from each other in terms of polarity of chromatic dispersion at the predetermined signal light wavelength; connecting the second and third transmission lines to each other with an unknown dispersion distribution state in a longitudinal direction thereof; and connecting the first and second transmission lines, so as to construct an optical transmission line; wherein a dispersion distribution state of transmission lines in the longitudinal direction thereof in the second area is measured so as to inspect the second transmission line where the optical transmission line achieves a desirable transmission characteristic. Here, the desirable transmission characteristic means that the whole has a predetermined cumulative dispersion, and the dispersion has the same polarity without being connected over a long distance, in order to attain a desirable transmission speed. The dispersion distribution state of the first transmission line in the longitudinal direction may be known beforehand or measured beforehand.

Instill another aspect, the present invention provides an optical transmission line comprising positive and negative dispersion parts with positive and negative chromatic dispersions, respectively; wherein, in a portion where the positive and negative dispersion parts adjoin each other, a smaller mode field diameter in the positive and negative dispersion parts always has a ratio of 0.99 or less with respect to a greater mode field diameter therein.

Preferably, in the adjoining portion, the mode field diameter of the positive dispersion part is greater than that of the negative dispersion part. Preferably, in the adjoining portion, the ratio of the mode field diameter of the negative dispersion part to that of the positive dispersion part is at least 0.75 but not greater than 0.99. In still another aspect, the present invention provides an optical transmission line comprising positive and negative dispersion parts with positive and negative chromatic dispersions, respectively; wherein, in a portion where the positive and negative dispersion parts adjoin each other, the positive and negative dispersion parts exhibit respective transmission losses differing from each other by at least 0.01 dB at a predetermined wavelength.

The predetermined wavelength in this specification is a wavelength falling within the range of 1310 nm to 1625 nm, for example.

DETAILED DESCRIPTION OF THE PREFERRED EMBODIMENTS

In the following, embodiments of the present invention will be explained in detail with reference to the accompanying drawings. In the explanation of the drawings, constituents identical to each other will be referred to with numerals identical to each other without repeating their overlapping descriptions.

Figure 1:
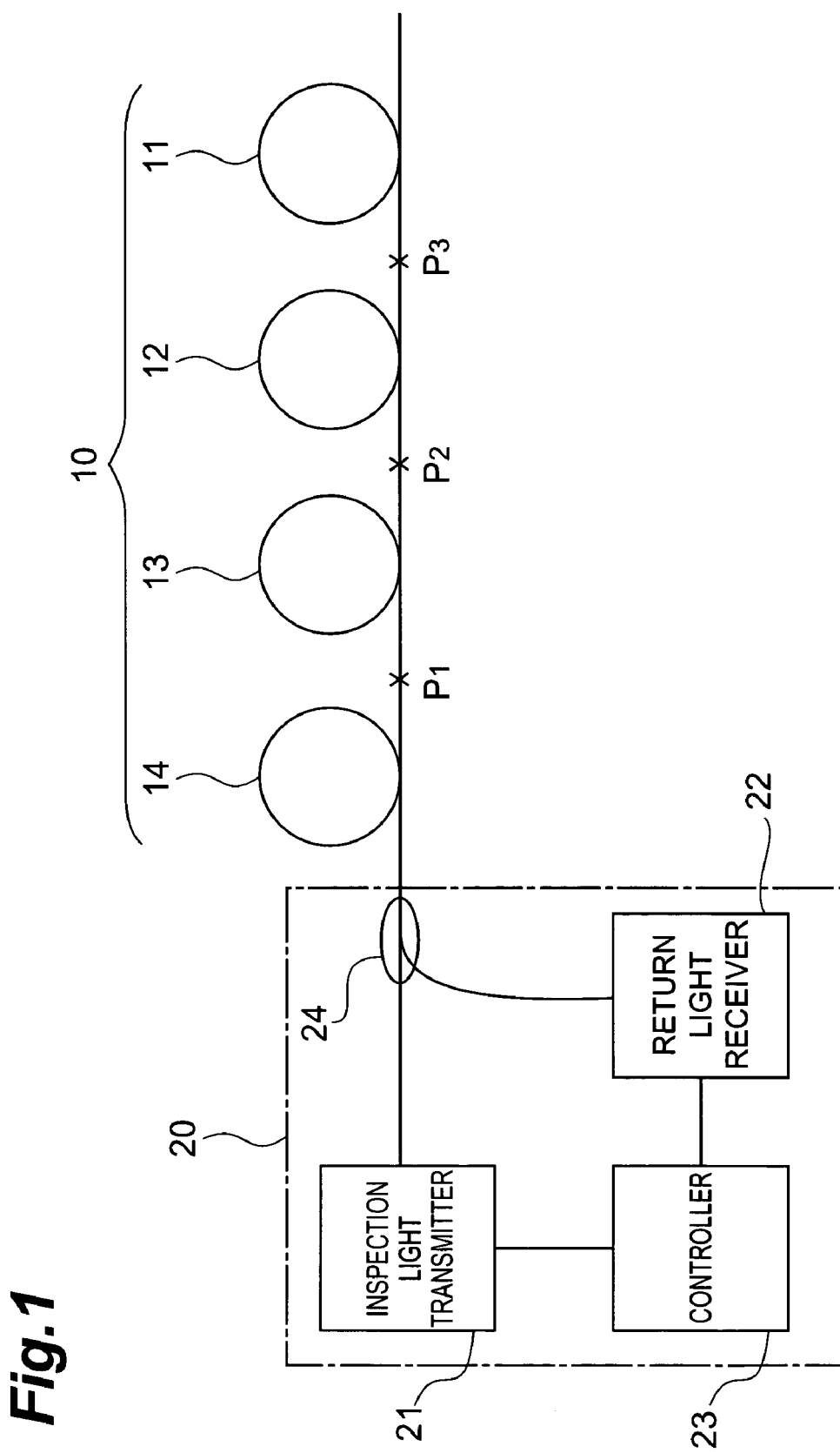
FIG. 1 is an explanatory view of the optical transmission line constructing method in accordance with an embodiment of the present invention.

FIG. 1 is an explanatory view of the optical transmission line constructing method in accordance with an embodiment of the present invention. This drawing shows an optical transmission line 10 to be constructed by the optical transmission line constructing method in accordance with this embodiment, and an OTDR apparatus 20 employed for carrying out the optical transmission line constructing method in accordance with this embodiment. The optical transmission line constructing method encompasses not only a method of connecting optical fibers selected from individual cable groups, so as to construct an optical transmission line having a desirable characteristic; but also a method of specifying an optical fiber branching position in already connected optical transmission lines, so as to construct a branch transmission line.

The optical transmission line 10 to be constructed is constituted by optical fibers 11 to 13 which have already been connected in succession, and an optical fiber 14 to be newly connected to one end of the optical fiber 13. The optical fibers 11 to 14 differ from each other in terms of a transmission characteristic.

For example, each of the optical fibers 11 and 13 has a positive chromatic dispersion, whereas each of the optical fibers 12 and 14 has a negative chromatic dispersion. The optical transmission line 10 constituted by such optical fibers 11 to 14 cascaded together has a locally large absolute value of chromatic dispersion and thus can restrain signal light from deteriorating its waveform because of nonlinear optical phenomena, but has a small absolution value of cumulative chromatic dispersion as a whole and thus can restrain signal light from deteriorating its wave form because of the cumulative chromatic dispersion.

Preferably, the respective chromatic dispersions of the optical fibers 11 to 14 have the same absolute value. In this case, when the optical fibers 11 to 14 have the same length, the total cumulative chromatic dispersion of the optical transmission line 10 can attain a sufficiently small absolute value.

Preferably, the optical fibers 11 to 14 have zero dispersion slopes at any of wavelengths within the wavelength band of 1300 nm to 1650 nm. In this case, the optical transmission line 10 has a flat chromatic dispersion over a wide wavelength band, and thus can transmit signal light in a wide wavelength band.

For reducing the splice loss, it will be preferred if the optical fibers 11 to 14 have the same mode field diameter. For determining the connecting state of the optical fibers, it will be preferred if the positive and negative dispersion optical fibers have respective mode field diameters different from each other as will be explained later.

Preferably, the number of alternations between the positive and negative dispersion optical fibers alternately connected in an optical transmission line of a repeater span or between a transmitter and a receiver is at least 2. Even when individual optical fibers have actual chromatic dispersions different from a designed value because of fluctuations in manufacture, the fluctuations are averaged more as the number of alternations is greater, whereby the total chromatic dispersion of the optical transmission line approaches the designed value.

Preferably, each of the optical fibers 11 to 14 has a length of 10 km or less. In this case, the absolute value of cumulative dispersion from the light entrance end to individual positions of the optical transmission line is small, which is preferred when restraining the signal light from deteriorating its waveform.

The OTDR apparatus 20 determines whether newly connecting the optical fiber 14 to the optical fibers 11 to 13 can construct the optical transmission line 10 having a desirable characteristic or not. The OTDR apparatus 20 comprises an inspection light transmitter 21, a return light receiver 22, a controller 23, and an optical coupler 24.

The inspection light transmitter 21 outputs pulsed inspection light to the optical coupler 24. The return light receiver 22 receives return light having arrived from the optical coupler 24, and detects a temporal change in characteristic information (e.g., power level or frequency shift amount) of the return light. The controller 23 orders the inspection light transmitter 21 to output the pulsed inspection light, instructs the return light receiver 22 to detect the temporal change in characteristic information of return light, receives the temporal change in characteristic information of return light from the return light receiver 22, and evaluates thus received temporal change. The optical coupler 24 causes the inspection light outputted from the inspection light transmitter 21 to be made incident on the entrance end of the optical fiber 14, and outputs to the return light receiver 22 the return light having arrived from the optical fiber 14.

In the following manner, the OTDR apparatus 20 operates under the control of the controller 23. The inspection light transmitter 21 outputs the pulsed inspection light. By way of the optical coupler 24, the inspection light enters one end of the optical fiber 14 and propagates through the optical fibers 14, 13, 12, and 11 in succession. During the propagation of inspection light, return light of the inspection light is generated by various causes. The return light advances through the transmission line 10 toward the optical coupler 24, and reaches the return light receiver 22 byway of the optical coupler 24. The return light having arrived at the return light receiver 22 is received thereby, so that the temporal change in characteristic information of the return light is detected. The controller 23 displays and evaluates the temporal change in characteristic information of return light. Respective return light components generated at individual positions in the longitudinal direction of the optical transmission line 10 reach the return light receiver 22 at times corresponding to their positions (elapsed times with reference to the inspection light output time). Therefore, the temporal change in characteristic information of return light represents a distribution of characteristic information of return light in the longitudinal direction of the optical transmission line 10.

In the optical transmission line constructing method in accordance with this embodiment, the optical transmission line 10 is constructed in the following manner by using the OTDR apparatus 20. Explained here will be a case where the optical fibers 11 to 13 have already been connected together, and the optical fiber 14 is newly connected to the optical fiber 13, so as to construct the optical transmission line 10 having a desirable characteristic.

First, one end of the optical fiber 14 having a certain transmission characteristic is connected to the optical fiber 13, and the optical coupler 24 of the OTDR apparatus 20 is connected to the other end of the optical fiber 14. The pulsed inspection light outputted from the inspection light transmitter 21 of the OTDR apparatus 20 is made incident on the other end (entrance end) of the optical fiber 14 by way of the optical coupler 24, and is caused to propagate through the optical fibers 13, 14, 12, and 11 in succession. Then, the respective return light components of inspection light generated at the individual positions in the longitudinal direction of the optical fibers 11 to 14 are received by the return light receiver 22 by way of the optical coupler 24, so as to evaluate a distribution of characteristic information of return light in the longitudinal direction of the optical fibers 11 to 14.

If the result of evaluation is as desired, the optical transmission line 10 is constructed with the optical fiber 14 connected thereto. If the result of evaluation is not as desired, on the other hand, another optical fiber 14' having a transmission characteristic different from that of the optical fiber 14 is connected to the optical fiber 13, and a distribution of characteristic information of return light in the longitudinal direction of the optical fibers 11 to 13 and 14' is evaluated as mentioned above. Thus, the optical fiber 14 employed when a desirable result of evaluation is seen is connected to the former optical fibers, so as to construct the optical transmission line 10.

Preferably, the transmission characteristic is a mode field diameter, and the characteristic information is a power level of return light corresponding to the mode field diameter. Preferably, the inspection light includes first and second wavelengths of light, the transmission characteristic is chromatic dispersion, and the characteristic information is a difference between respective arrival times of the first and second wavelengths at the entrance end. Preferably, the transmission characteristic is transmission loss, and the characteristic information is a power level of return light corresponding to the transmission loss. Preferably, the transmission characteristic is a frequency shift amount, and the characteristic information is a frequency shift of return light inherent in each of the optical fibers 11 to 14. In the following, these cases will be explained.

Figure 2:
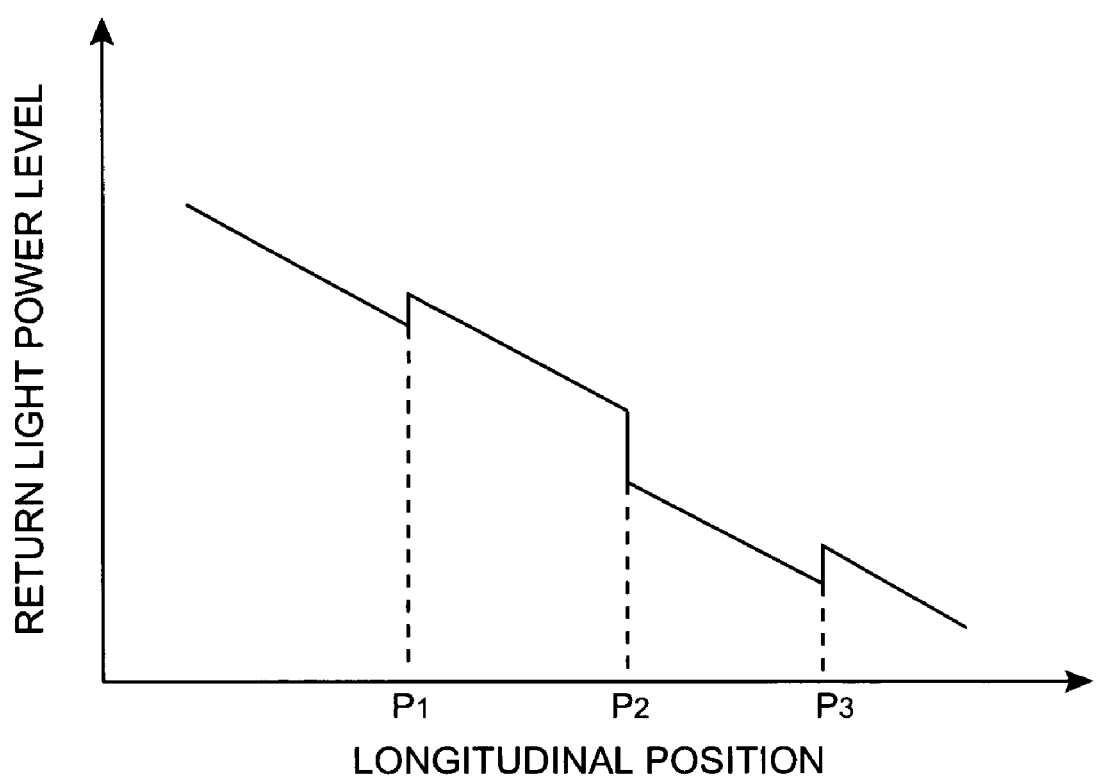
FIG. 2 is a chart showing a first example of characteristic information distribution of return light detected by a return light receiver 22 of an OTDR apparatus 20 in the optical transmission line constructing method in accordance with the embodiment.

FIG. 2 is a chart showing a first example of characteristic information distribution detected by the return light receiver 22 of the OTDR apparatus 20 in the optical transmission line constructing method in accordance with this embodiment. In this chart, the abscissa indicates the position in the longitudinal direction of the optical fibers 11 to 14, whereas the ordinate indicates the power level of return light. Here, the optical fibers 11 to 14 have respective mode field diameters different from each other. Each of the optical fibers 11 and 13 exhibits a positive chromatic dispersion, whereas each of the optical fibers 12 and 14 exhibits a negative chromatic dispersion.

Preferably, at each of joints $P_1$ to $P_3$ (see FIG. 1) of the optical fibers 11 to 14, the mode field diameter of one of the positive dispersion optical fiber 12, 14 and negative dispersion optical fiber 11, 13 is always greater than that of the other by at least a predetermined value. Preferably, at each of the positions $P_1$ to $P_3$, the mode field diameter of the positive dispersion optical fiber 12, 14 is greater than that of the negative dispersion optical fiber 11, 13. Preferably, at each of the positions $P_1$ to $P_3$, the ratio of the mode field diameter of the negative dispersion optical fiber 11, 13 to that of the positive dispersion optical fiber 12, 14 is at least 0.75 but not greater than 0.99.

For example, each of the positive dispersion optical fibers 12, 14 has a mode field diameter of 7.95 μm to 8.04 μm, and a chromatic dispersion of +8.0 ps/nm/km at a wavelength of 1550 nm. Each of the negative dispersion optical fibers 11, 13 has a mode field diameter of 7.75 μm to 7.85 μm, and a chromatic dispersion of −8.0 ps/nm/km at a wavelength of 1550 nm. Since the dispersion optical fibers 11, 13 have a mode field diameter smaller than that of the positive dispersion optical fibers 12, 14, the power level of return light arriving at the return light receiver 22 from theformer optical fibers is higher than that from the latter optical fibers.

Therefore, as shown in FIG. 2, the longitudinal distribution of the power level of return light generally tends to be downward to the right but increases stepwise at the junction $P_1$ between the positive dispersion optical fiber 14 and the negative dispersion optical fiber 13, decreases stepwise at the junction $P_2$ between the negative dispersion optical fiber 13 and the positive dispersion optical fiber 12, and increases stepwise at the junction $P_3$ between the positive dispersion optical fiber 12 and the negative dispersion optical fiber 11.

Though a splice loss due to fusion splicing occurs at each of the junctions $P_1$ to $P_3$, the difference in return power level between the positive and negative dispersion optical fibers is greater than the splice loss. Therefore, it can be determined that the positions ($P_1$, $P_3$) where the return light power level locally increases are transitional positions from the positive dispersion optical fiber to the negative dispersion optical fiber, and it can be determined that the position ($P_2$) where the return light power level locally decreases is a transitional position from the negative dispersion optical fiber to the positive dispersion optical fiber.

Figure 3:
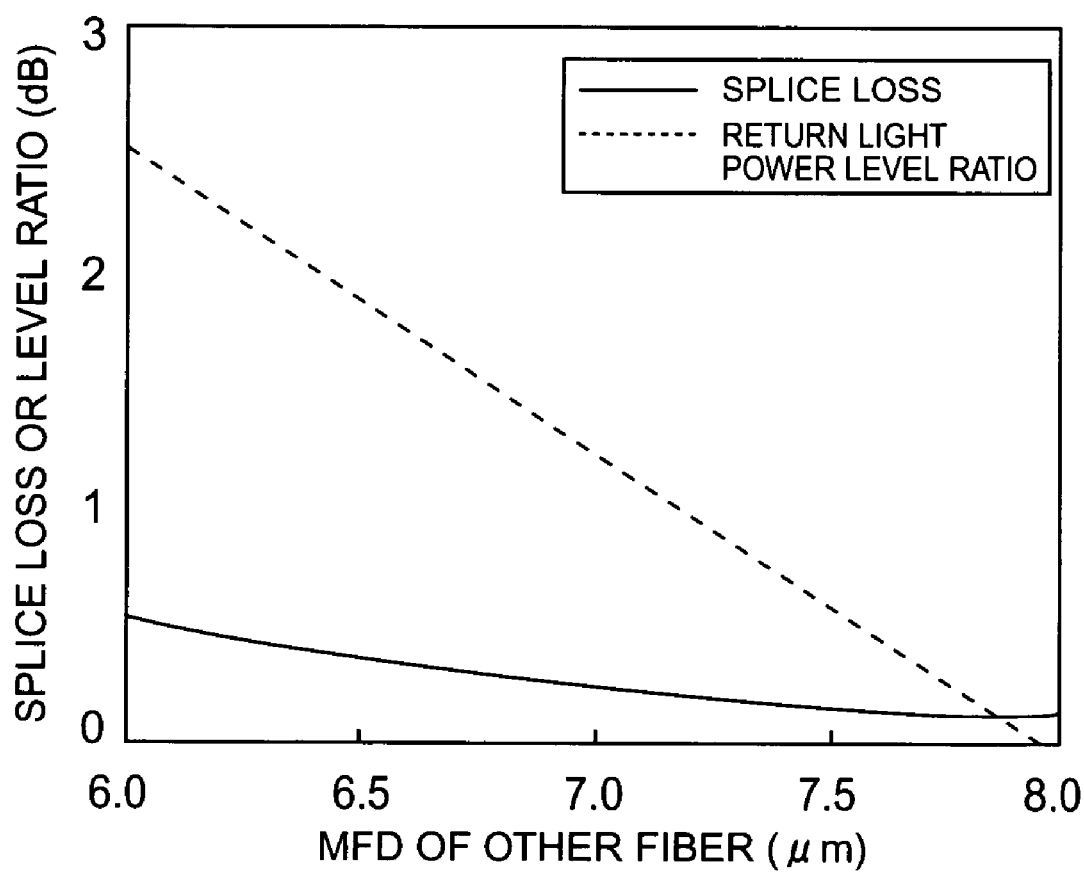
FIG. 3 is a graph showing the relationship between each of the splice loss and return light power level ratio and the mode field diameter.

FIG. 3 is a graph showing the relationship between each of the splice loss and return light power level ratio and the mode field diameter. Here, one of fusion-spliced optical fibers has a mode field diameter of 8.0 μm, the amount of core center position deviation at the time of fusion splicing is 1.0 μm, and the mode field diameter of the other optical fiber is changed from 6.0 μm to 8.0 μm, so as to study the splice loss and return light power level ratio. As can be seen from this graph, the mode field diameter of the other optical fiber is required to be 7.9 μm or less in order for the return light power level ratio to exceed the splice loss. For suppressing the splice loss to 0.5 dB or less, the mode field diameter of the other optical fiber is required to be at least 6.0 μm.

In view of the foregoing, for determining whether the longitudinal chromatic dispersion is positive or negative and suppressing the total loss of the optical transmission line, it is desirable that the ratio of the mode field diameter of the negative dispersion optical fibers to that of the positive dispersion optical fibers be 0.75 to 0.99. In order for the positive and negative dispersion optical fibers to have the same level of bend loss characteristic, the mode field diameter of the negative dispersion optical fiber is required to be smaller than that of the positive dispersion optical fiber. Therefore, it is desirable that the mode field diameter of the negative dispersion optical fibers be 0.75 to 0.99 times that of the positive dispersion optical fibers.

Figure 4:
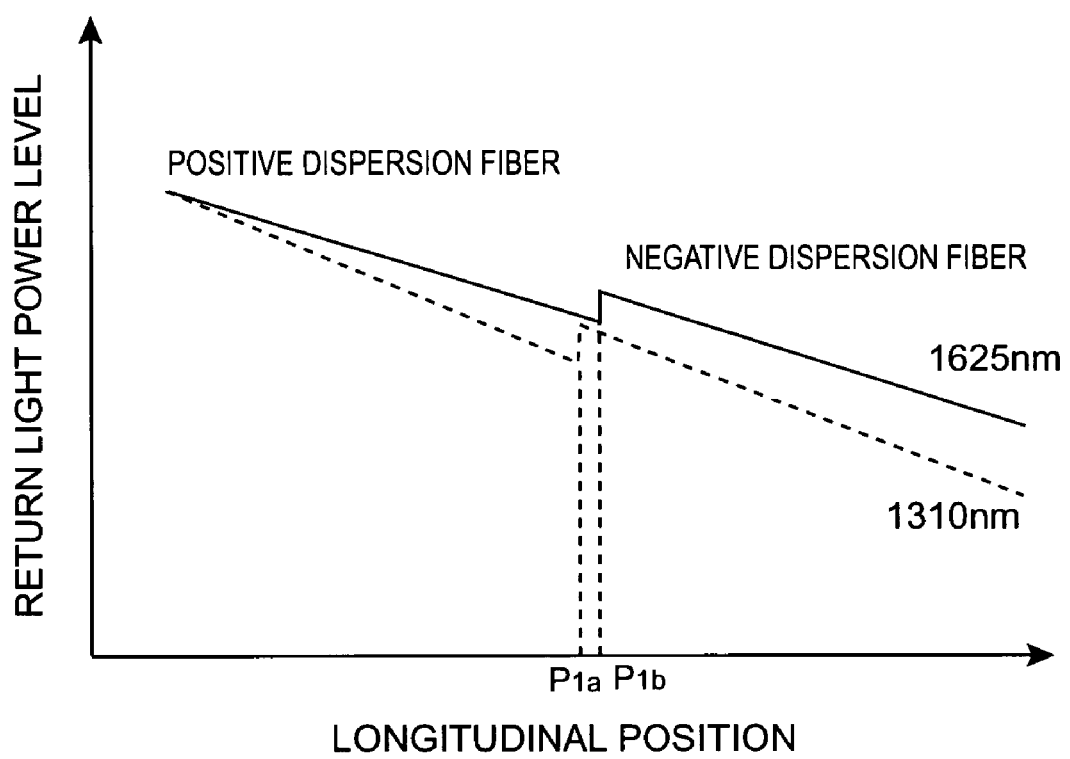
FIG. 4 is a chart showing a second example of characteristic information distribution of return light detected by the return light receiver 22 of the OTDR apparatus 20 in the optical transmission line constructing method in accordance with the embodiment.

FIG. 4 is a chart showing a second example of characteristic information distribution of return light detected by the return light receiver 22 of the OTDR apparatus 20 in the optical transmission line constructing method in accordance with this embodiment. In this chart, the abscissa indicates the position in the longitudinal direction of the optical fibers 11 to 14, whereas the ordinate indicates the power level of return light. Here, in the optical fibers 11 to 14, each of the optical fibers 11 and 13 exhibits a positive chromatic dispersion, whereas each of the optical fibers 12 and 14 exhibits a negative chromatic dispersion. As the inspection light, wavelengths of 1625 nm and 1310 nm are used.

Figure 5:
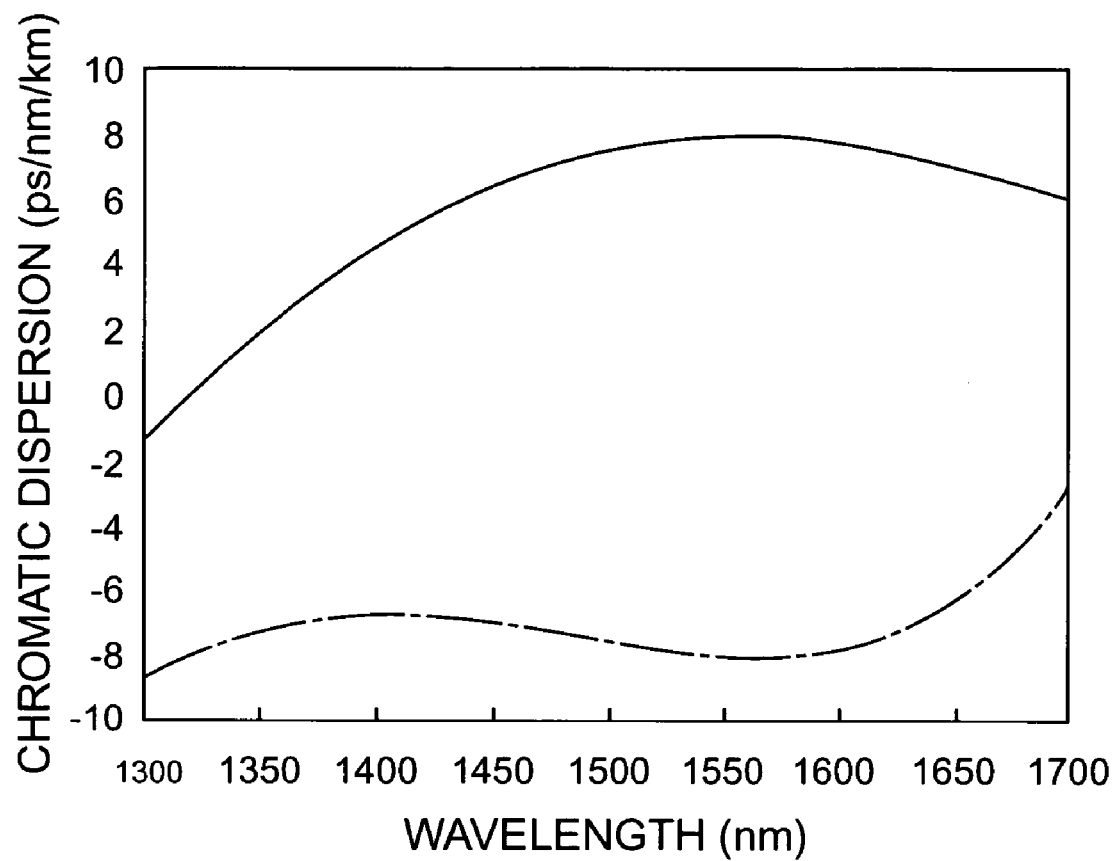
FIG. 5 is a chart showing chromatic dispersion characteristic examples of positive and negative dispersion optical fibers.

FIG. 5 shows respective chromatic dispersion characteristics of the positive dispersion optical fibers 11, 13 and the negative dispersion optical fibers 12, 14. The positive dispersion optical fibers 11, 13 exhibit a longer group delay time on the longer wavelength side, and a shorter group delay time on the shorter wavelength side. On the other hand, the negative dispersion optical fibers 12, 14 exhibit a shorter group delay time on the longer wavelength side, and a longer group delay time on the shorter wavelength side.

This indicates that, when the inspection light is initially incident on the positive dispersion optical fiber 14 from the optical coupler 24, a junction $P_{1a}$ detected by the inspection light at the wavelength of 1310 nm is located nearer to the entrance end than is a junction $P_{2b}$ detected by the inspection light at the wavelength of 1625 nm. When the inspection light is initially incident on the negative dispersion optical fiber from the optical coupler 24, by contrast, a junction detected by the inspection light at the wavelength of 1625 nm is located nearer to the entrance end than is a junction detected by the inspection light at the wavelength of 1310 nm. Therefore, whether a position is a transitional position from a positive dispersion optical fiber to a negative dispersion optical fiber or a transitional position from a negative dispersion optical fiber to a positive dispersion optical fiber can be determined by using two wavelengths of inspection light.

At a length of 10 km, the positive dispersion optical fiber 11, 13 exhibits an average chromatic dispersion value of +5.3 ps/nm/km at a wavelength of 1310 nm to 1625 nm, thus yielding a group delay time difference of 16700 ps (=5.3 ps/nm/km×(1625−1310) nm×10 km). This group delay time difference corresponds to a fiber length of 3.4 m (=16700× $10^{-12}$ sec×3.0×$10^8$ m/sec/1.47), and thus is at a level detectable by the OTDR technique.

Though FIG. 4 shows only the positive dispersion optical fiber 14 and negative dispersion optical fiber 13, the same is applicable to the positive dispersion optical fiber 12 and negative dispersion optical fiber 11. This method not only can detect the longitudinal distribution of whether chromatic dispersion is positive or negative, but also can quantitatively grasp the cumulative chromatic dispersion between junction positions.

Though FIG. 4 relates to a case where junctions are detected by using two wavelengths of inspection light, reflected light components of two wavelengths of inspection light from a position where optical coupling is lost, such as breaking or cutting of an optical fiber, can be detected as return light, whereby the position where optical coupling is lost can be determined, and the cumulative chromatic dispersion from the entrance end to the optical coupling losing position can quantitatively be grasped. The losing of optical coupling includes not only the breaking/cutting of the optical fiber, but also the opening of connector connections and the opening of mechanical splices. Positions can be determined not only for reflective parts, but also for parts where the return light power level changes drastically.

Figure 6:
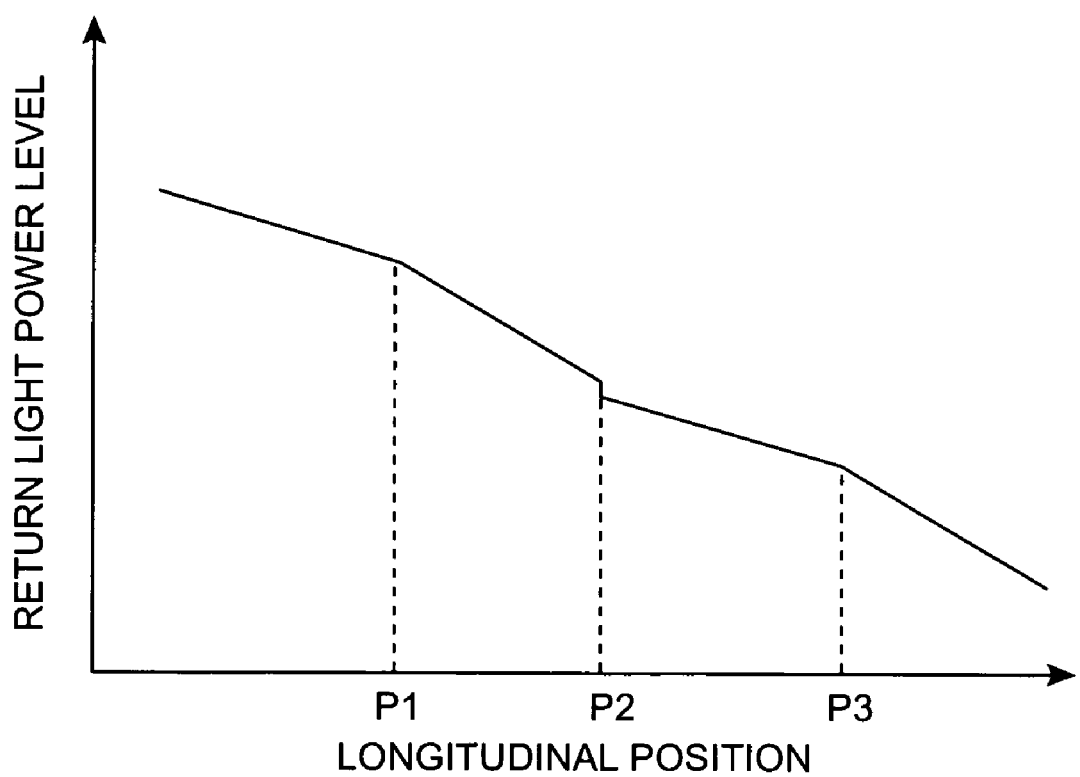
FIG. 6 is a chart showing a third example of characteristic information distribution of return light detected by the return light receiver 22 of the OTDR apparatus 20 in the optical transmission line constructing method in accordance with the embodiment.

FIG. 6 is a chart showing a third example of characteristic information distribution of return light detected by the return light receiver 22 of the OTDR apparatus 20 in the optical transmission line constructing method in accordance with this embodiment. In this chart, the abscissa indicates the position in the longitudinal direction of the optical fibers 11 to 14, whereas the ordinate indicates the power level of return light. Here, in the optical fibers 11 to 14, each of the optical fibers 11 and 13 exhibits a negative chromatic dispersion, whereas each of the optical fibers 12 and 14 exhibits a positive chromatic dispersion. Concentrations of OH groups remaining in core regions of the optical fibers 11 to 14 at the time of making are adjusted such that, at an OH-group absorption peak wavelength of 1383 nm, each of the positive dispersion optical fibers 12, 14 exhibits a transmission loss of 0.35 dB/km, and each of the negative dispersion optical fibers 11, 13 exhibits a transmission loss of 0.50 dB/km. Employed as the inspection light is one at a wavelength of 1383 nm.

Since the transmission loss at the inspection light wavelength is greater in the negative dispersion optical fibers 12, 14 than in the positive dispersion optical fibers 11, 13, the gradient of the longitudinal distribution of return light is greater in the negative dispersion optical fibers 12, 14 than in the positive dispersion optical fibers 11, 13. Therefore, whether a position is a transitional position from a positive dispersion optical fiber to a negative dispersion optical fiber or a transitional position from a negative dispersion optical fiber to a positive dispersion optical fiber can be determined according to changes in the gradient of the longitudinal distribution of return light.

In the above, the OH-group concentration is changed among the respective core regions of the optical fibers 11 to 14, and the inspection light at the wavelength of 1383 nm is used. However, the inspection light wavelength and core region additives are not restricted thereto as long as the optical fibers exhibit a significant transmission loss at the inspection light wavelength while their transmission loss at the signal light wavelength is negligible.

Figure 7:
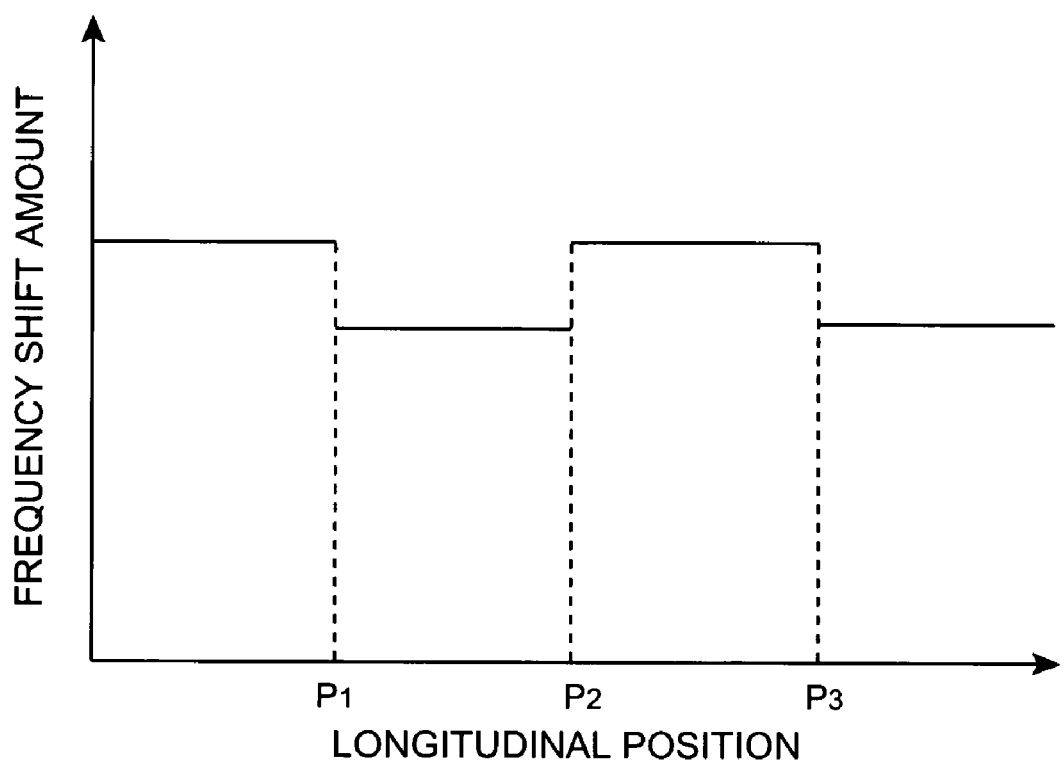
FIG. 7 is a chart showing a fourth example of characteristic information distribution of return light detected by the return light receiver 22 of the OTDR apparatus 20 in the optical transmission line constructing method in accordance with the embodiment.

FIG. 7 is a chart showing a fourth example of characteristic information distribution of return light detected by the return light receiver 22 of the OTDR apparatus 20 in the optical transmission line constructing method in accordance with the embodiment. In this chart, the abscissa indicates the position in the longitudinal direction of the optical fibers 11 to 14, whereas the ordinate indicates the frequency shift amount of return light with respect to the incident inspection light. Here, in the optical fibers 11 to 14, each of the optical fibers 11 and 13 exhibits a negative chromatic dispersion, whereas each of the optical fibers 12 and 14 exhibits a positive chromatic dispersion.

The relative refractive index difference of the center core region from the cladding region is assumed to be 0.6% in the negative dispersion optical fibers 11, 13, and 0.7% in the positive dispersion optical fibers 12, 14. Inspection light having a narrow bandwidth in the 1550-nm wavelength band is made incident on the optical transmission line, and the longitudinal distribution of frequency shift amount of return light is measured by using a Brillouin OTDR technique. The frequency shift amount of Brillouin scattering light varies depending on dopant concentrations in the core regions of optical fibers. Therefore, the frequency shift amount of return light varies between the positive dispersion optical fibers 12, 14 and the negative dispersion optical fiber 11, 13 whose core regions are doped with different amounts of $GeO_2$ in order to adjust the relative refractive index difference. Hence, whether a position is a transitional position from a positive dispersion optical fiber to a negative dispersion optical fiber or a transitional position from a negative dispersion optical fiber to a positive dispersion optical fiber can be determined according to changes in the frequency shift amount of the longitudinal distribution of return light.

On the other hand, an optical fiber preform in which at least a part of a core region is substantially made of pure silica glass is prepared, and an optical fiber is made while intermittently changing the drawing tension when drawing the optical fiber preform. Since the residual stress is concentrated at the part of pure silica glass where the viscosity at the time of drawing is low, a residual stress distribution is formed along the longitudinal axis of thus obtained optical fiber, so that a refractive index distribution is formed in the pure silica glass part, whereby positive and negative dispersion parts are formed so as to alternate with each other. The inspection light in the 1550-nm wavelength band is made incident on one end of thus manufactured optical fiber, and the longitudinal distribution of the frequency shift amount of return light is measured by using the Brillouin OTDR technique. The frequency shift amount of Brillouin scattering light varies depending on the residual stress in the core region of the optical fiber. Therefore, whether a position is a transitional position from a positive dispersion part to a negative dispersion part or from a negative dispersion part to a positive dispersion part can be determined according to changes in the frequency shift amount of the longitudinal distribution of return light.

Figure 8:
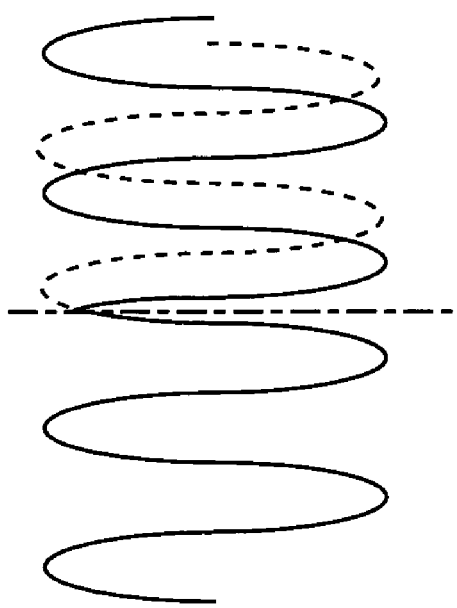
FIG. 8 is a chart showing a fifth example of characteristic information distribution of return light detected by the return light receiver 22 of the OTDR apparatus 20 in the optical transmission line constructing method in accordance with the embodiment.
Figure 8:
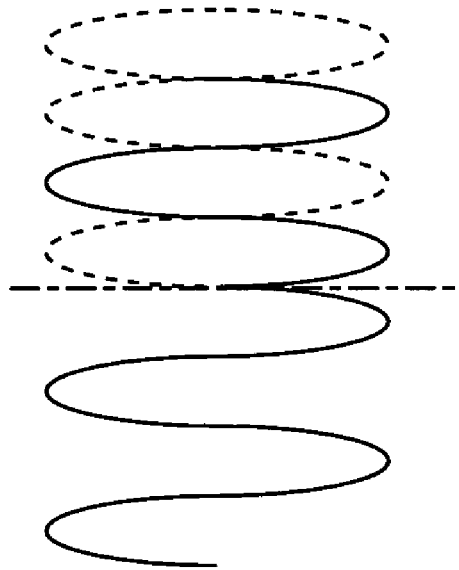

FIG. 8 is a chart showing a fifth example of characteristic information distribution of return light detected by the return light receiver 22 of the OTDR apparatus 20 in the optical transmission line constructing method in accordance with this embodiment. In this chart, the abscissa indicates the position in the longitudinal direction of the optical fibers 11 to 14, whereas the ordinate indicates the power level of return light. Here, the respective polarities of chromatic dispersions in the optical fibers 11 to 14 are assumed to alternate with each other, whereas it will be preferred if the polarity of chromatic dispersion in any (e.g., optical fiber 14 disposed closest to the inspection light entrance end) of the optical fibers 11 to 14 has been known. First and second wavelengths of inspection light different from each other are employed. Stokes scattering light or anti-Stokes scattering light occurring during when the two wavelengths of inspection light propagate through the optical transmission line 10 are used as return light.

As shown in FIG. 8, the power level of return light fluctuates depending on the longitudinal position in the optical transmission line 10. This is because of the fact that the level of phase mismatching between the two wavelengths of inspection light upon Stokes scattering or anti-Stokes scattering fluctuates depending on the longitudinal position in the optical transmission line 10. Between before and after a junction between positive and negative dispersion optical fibers, the power level of return light shifts from a tendency to increase to a tendency to decrease or vice versa as indicated by solid lines in the drawing. Therefore, a junction position between positive and negative dispersion optical fibers can be determined by detecting such a position shifting from the tendency to increase to the tendency to decrease (or vice versa). This method not only can determine the longitudinal distribution of whether the chromatic dispersion is positive or negative, but also can quantitatively grasp the cumulative chromatic dispersion between junction positions.

When the tendency to increase/decrease changes at a position where the power level of return light attains a maximum or minimum value, however, this position cannot be detected. In such a case, it will be sufficient if any of the wavelengths of inspection light is changed so that the tendency to increase/decrease changes at a position where the power level is neither maximum nor minimal value.

Since the tendency to increase/decrease does not change at a junction position of two optical fibers having the same polarity of chromatic dispersion as indicated by broken lines in the drawing, the above-mentioned method cannot determine this position. For determining the junction of two optical fibers having the same polarity of chromatic dispersion, it will be sufficient if a method based on a normal OTDR technique is also used.

Though the foregoing explanation relates to one optical transmission line 10, the optical transmission line constructing method in accordance with this embodiment is also applicable to a case where a plurality of optical fibers differing from each other in terms of a transmission characteristic exist within an optical cable, so as to choose optical fibers having a desirable characteristic from the plurality of optical fibers by using an OTDR technique, and connect thus chosen optical fibers together, whereby an optical transmission line having a desirable characteristic can be constructed. Namely, an optical fiber is chosen from a plurality of optical fibers differing from each other in terms of a transmission characteristic included in a first optical cable, and an optical fiber is chosen from a plurality of optical fibers differing from each other in terms of the transmission characteristic included in a second optical cable. Subsequently, inspection light is made incident on the entrance end of each of the chosen optical fibers, respective return light components of the inspection light occurring at individual positions of the optical fiber in the longitudinal direction are detected on the entrance end side, and characteristic information of return light in the optical fiber is evaluated. This characteristic information evaluating technique is the same as that in the above-mentioned first to fourth examples. According to the result of evaluation, it is determined whether the chosen optical fibers connected together have a desirable characteristic or not. If the result of determination is favorable, the chosen optical fibers are connected together. If the result of determination is unsuitable, by contrast, another optical fiber is chosen from any of the first and second optical cables, and characteristic information is evaluated and determined as mentioned above. This can construct an optical transmission line having a desirable characteristic.

Though the above-mentioned explanation relates to a case where all the optical fibers 11 to 14 construct the optical transmission line 10, the optical transmission line constructing method in accordance with this embodiment may use the optical fiber 14 as a reference optical fiber among the optical fibers 11 to 14. Here, the reference optical fiber 14 whose transmission characteristic has already been known is connected to the optical coupler 24 of the OTDR apparatus 20. The inspection light outputted from the inspection light transmitter 21 of the OTDR apparatus 20 initially propagates through the reference optical fiber 14 and then through the optical fibers 13 to 11. The return light receiver 22 of the OTDR apparatus 20 detects respective return light components of the inspection light occurring at individual positions of the optical fibers 11 to 13 in the longitudinal direction, and characteristic information of return light in the optical fibers 11 to 13 is evaluated in comparison with that of return light in the reference optical fiber 11. The characteristic information evaluating technique is the same as that in the above-mentioned first to fourth examples. As a consequence, the characteristic information of the optical fibers 11 to 13 constructing the optical transmission line is grasped in comparison with that of the reference optical fiber 11, whereby it is determined whether the optical transmission line has a desirable characteristic or not.

Figure 9:
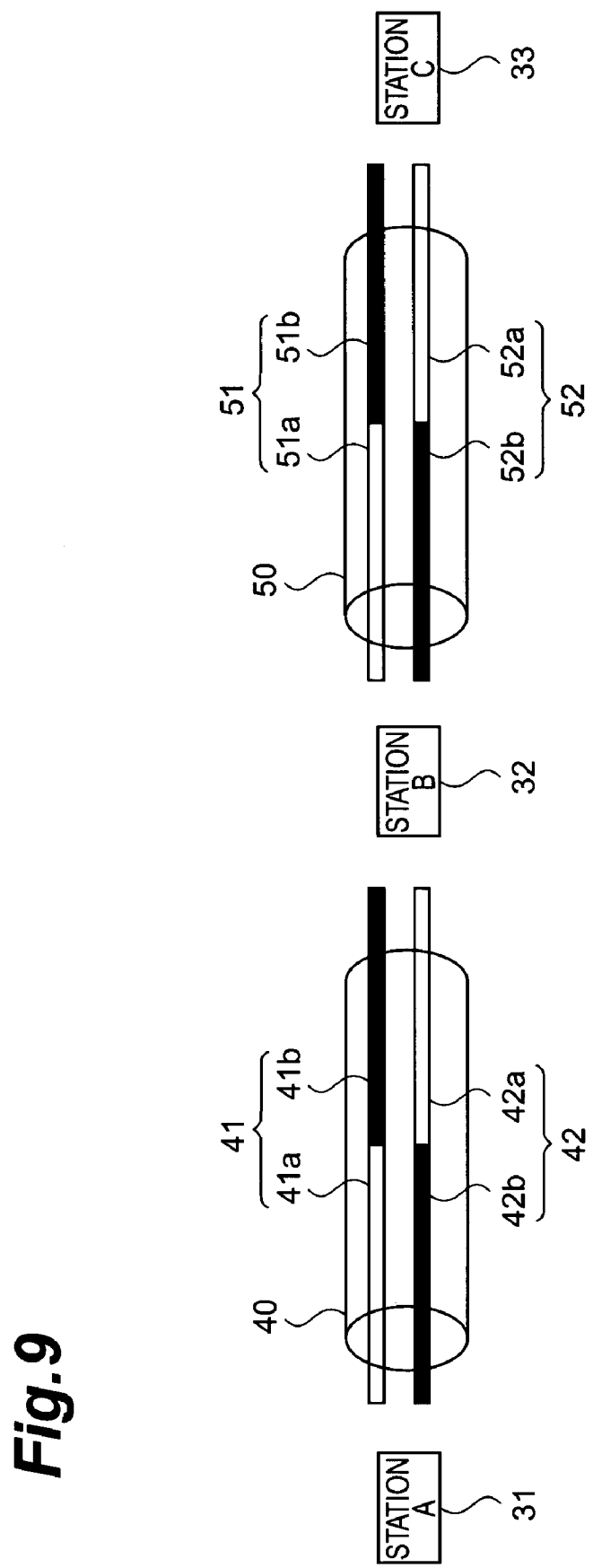
FIG. 9 is a view showing an example of application of the optical transmission line constructing method in accordance with the embodiment.

The optical transmission line constructing method in accordance with this embodiment is also applicable to a case constructing the optical transmission line shown in FIG. 9. As shown in FIG. 9, an optical cable 40 is placed between stations 31 and 32, whereas an optical cable 50 is placed between stations 32 and 33. The optical cable 40 includes an optical transmission line 41 constituted by a positive dispersion optical fiber 41a and a negative dispersion optical fiber 41b which are connected together, and an optical transmission line 42 constituted by a positive dispersion optical fiber 42a and a negative dispersion optical fiber 42b which are connected together. The positive dispersion optical fiber 41a and the negative dispersion optical fiber 42b are disposed on the station 31 side, whereas the positive dispersion optical fiber 42a and the negative dispersion optical fiber 41b are disposed on the station 32 side. The optical cable 50 includes an optical transmission line 51 constituted by a positive dispersion optical fiber 51a and a negative dispersion optical fiber Sib which are connected together, and an optical transmission line 52 constituted by a positive dispersion optical fiber 52a and a negative dispersion optical fiber 52b which are connected together. The positive dispersion optical fiber 51a and the negative dispersion optical fiber 52b are disposed on the station 32 side, whereas the positive dispersion optical fiber 52a and the negative dispersion optical fiber 51b are disposed on the station 33 side.

When optically connecting the respective optical transmission lines included in the optical cables 40 and 50 to each other in the station 32, there are four modes, i.e., the connection between the negative dispersion optical fiber 41b and the positive dispersion optical fiber 51a, the connection between the positive dispersion optical fiber 42a and the negative dispersion optical fiber 52b, the connection between the negative dispersion optical fiber 41b and the negative dispersion optical fiber 52b, and the connection between the positive dispersion optical fiber 42a and the positive dispersion optical fiber 51a. Among them, the connection between the positive dispersion optical fibers and the connection between the negative dispersion optical fibers elongate an area where chromatic dispersion has the same polarity, so that the cumulative chromatic dispersion value increases in this area. As a result, self-phase modulation, which is a nonlinear optical phenomenon, and the cumulative chromatic dispersion interact with each other, thereby increasing the possibility of deteriorating the transmission characteristic. Therefore, the connection between the negative dispersion optical fiber 41b and the positive dispersion optical fiber 51a or the connection between the positive dispersion optical fiber 42a and the negative dispersion optical fiber 52b is preferred.

When there is no marking or the like for identifying the state of distribution of chromatic dispersion in the longitudinal direction of each transmission line in each of the optical cables 40, 50 placed beforehand, the state of distribution of chromatic dispersion in the longitudinal direction of each transmission line cannot be seen from the appearance. Even if the cumulative chromatic dispersion is measured in the whole length of each transmission line, the polarity of chromatic dispersion on the station 32 side of each transmission line cannot be determined, since each optical transmission line comprises positive and negative dispersion optical fibers connected together.

When the state of distribution of chromatic dispersion in the longitudinal direction of each optical transmission line included in each of the optical cables 40, 50 is measured by using the optical transmission line constructing method in accordance with this embodiment, the negative dispersion optical fiber 41b and the positive dispersion optical fiber 51a can be connected to each other, or the positive dispersion optical fiber 42a and the negative dispersion optical fiber 52b can be connected to each other, whereby the optical transmission line between the stations 31 and 33 can attain an excellent characteristic.

Though the foregoing explanation relates to a case where both the optical cables 40, 50 have already been placed, the same holds in a case where one of the optical cables 40, 50 has already been placed whereas the other is newly provided. Though the tolerable level of cumulative chromatic dispersion in a continuous area where chromatic dispersion has the same polarity varies depending on the detail of the transmission system, it is desirable that the absolute value of cumulative chromatic dispersion be suppressed to 1000 ps/nm or less when the propagation speed is 10 Gb/s.

In the system configuration shown in FIG. 9, the optical transmission line constructing method in accordance with this embodiment is also applicable to the following example.

In the case where both of the optical cables 40, 50 have already been placed, the station 32 has conventionally been configured such as to convert an optical signal having arrived by way of an optical transmission line included in one optical cable into an electric signal, convert this electric signal into an optical signal again, and send the reconverted optical signal to an optical transmission line included in the other optical cable. For optically connecting the respective optical transmission lines included in the optical cables 40 and 50 to each other without carrying out such opto-electro-optic conversion in the station 32, it is necessary to determine whether or not the optical connection is realizable in terms of chromatic dispersion, and which optical transmission lines in a plurality of optical transmission lines included in the optical cables 40, 50 should optically be connected to each other. When the optical transmission line constructing method in accordance with this embodiment is used for such determination, an optical transmission line having an excellent characteristic between the stations 31 and 33 can be constructed.

If the optical cable 40 includes a plurality of optical transmission lines when extending an optical transmission line further from the station 31 to the station 33 by way of the station 32 in the case where the optical cable 40 has already been placed between the stations 31 and 32, the optical transmission line constructing method in accordance with this embodiment can be used so as to choose an optical transmission line suitable for long-distance transmission from among the plurality of optical transmission lines, and connect thus chosen optical transmission line to the optical transmission line between the stations 32 and 33. As a consequence, an optical transmission line having an excellent characteristic between the stations 31 and 33 can be constructed.

The optical transmission line constructing method in accordance with this embodiment can also be employed for constructing a branch optical transmission line. For example, a plurality of transmission lines, each comprising at least two kinds of a plurality of optical fibers connected together differing from each other in terms of chromatic dispersion, are provided; a dispersion distribution state of the transmission lines in the longitudinal direction thereof is measured; a branch transmission line connectable as a branch at a predetermined position in the longitudinal direction is chosen; and a branch connection is established. Alternatively, a dispersion distribution state in the longitudinal direction of a transmission line having a predetermined value of chromatic dispersion and comprising at least two kinds of a plurality of optical fibers connected together having respective values different from each other is measured; it is specified where a branch connection is possible in the longitudinal direction; and a branch connection is established.

As explained in detail in the foregoing, the present invention can easily construct an optical transmission line having a desirable characteristic by connecting a plurality of optical fibers differing from each other in terms of a transmission characteristic.

What is claimed is:

1. An optical transmission line constructing method comprising the steps of:

temporarily connecting a plurality of optical fibers in serial to make a provisional transmission line, the plural optical fibers being different among them in a transmission characteristic thereof;

making inspection light incident on an entrance end of the provisional transmission line;

detecting, on the entrance end side, respective return light components of the inspection light occurring at individual positions of the provisional transmission line in a longitudinal direction thereof;

evaluating a characteristic information distribution of return light in the longitudinal direction of the provisional transmission line to get the evaluation result of the provisional transmission line; and when the result of the evaluation of the provisional transmission line is desired, connecting the plurality of the optical fibers of the provisional transmission line among them to construct a desired optical transmission line and, when the result of the evaluation of the provisional transmission line is not desired, changing one of the plurality of the optical fibers of the provisional transmission line into another optical fiber of which transmission characteristics is different from the changed optical fiber, to make a new provisional transmission line and perform the evaluation of the new provisional transmission line to construct a desired optical transmission line.

2. An optical transmission line constructing method according to claim 1, wherein the transmission characteristic is a mode field diameter; and wherein the characteristic information is a power level of return light corresponding to the mode field diameter.

3. An optical transmission line constructing method according to claim 1, wherein the inspection light includes first and second wavelengths of light; wherein the transmission characteristic is chromatic dispersion; and wherein the characteristic information is a difference between respective arrival times of the first and second wavelengths at the entrance end.

4. An optical transmission line constructing method according to claim 1, wherein the transmission characteristic is transmission loss; and wherein the characteristic information is a power level of return light corresponding to the transmission loss.

5. An optical transmission line constructing method according to claim 1, wherein the transmission characteristic is a frequency shift amount;

and wherein the characteristic information is a frequency shift of return light inherent in each of the plurality of optical fibers.

6. An optical transmission line constructing method comprising the steps of:

choosing one of a plurality of optical fibers, included in a first optical cable, differing from each other in terms of a transmission characteristic, choosing one of a plurality of optical fibers, included in a second optical cable, differing from each other in terms of the transmission characteristic;

making inspection light incident on respective entrance ends of the chosen optical fibers;

detecting, on the entrance end side, respective return light components of the inspection light occurring at individual positions of the respective optical fibers chosen from the first and second optical cables in a longitudinal direction thereof;

evaluating a characteristic information distribution of return light in the longitudinal direction of the respective chosen optical fibers to get the evaluation results for the respective chosen optical fiber;

when the results of the evaluation of the chosen optical fiber from the first and second optical cables are desired, connecting the chosen optical fibers among them to construct a desired optical transmission line and, when any one of the results of the evaluation of the chosen optical fiber from the first and second optical cables is not desired, choosing another optical fiber from the optical cable, and performing the evaluation of the another optical fiber to construct the desired optical transmission line.

7. An optical transmission line constructing method according to claim 6, wherein the inspection light is made incident on the entrance ends of the optical fibers by way of a reference optical fiber having a reference transmission characteristic;

wherein respective return light components of the inspection light occurring at individual positions of the reference optical fiber and optical fibers in the longitudinal direction are detected; and wherein the characteristic information of return light in the optical fibers is evaluated in comparison with characteristic information of return light in the reference optical fiber.

8. An optical transmission line constructing method comprising the steps of:

choosing one of a plurality of optical fibers, included in a first optical cable, having a known transmission characteristics, choosing one of a plurality of optical fibers, included in a second optical cable, differing from each other in terms of the transmission characteristic;

making inspection light incident on entrance end of the optical fiber chosen from the second optical cable;

detecting, on the entrance end side, return light components of the inspection light occurring at individual positions of the optical fiber chosen from the second optical cable in a longitudinal direction thereof;

evaluating a characteristic information distribution of return light in the longitudinal direction of the optical fiber chosen from the second optical cable to get the evaluation results for the optical fiber chosen from the second optical cable;

when the result of the evaluation of the chosen optical fiber from the first and second optical cable is desired, connecting the chosen optical fibers among them to construct a desired optical transmission line and, when the result of the evaluation of the chosen optical fiber from the second optical cable is not desired, choosing another optical fiber from the second optical cable, and performing the evaluation of the another optical fiber to construct the desired optical transmission line.

* * * * *